UNITED STATES PATENT OFFICE.

FRANCIS MUDIE SPENCE AND DAVID DICK SPENCE, OF MANCHESTER, AND ALEXANDER ESILMAN, OF SOUTHPORT, ENGLAND.

PROCESS OF MAKING SODA-ALUM.

SPECIFICATION forming part of Letters Patent No. 454,189, dated June 16, 1891.

Application filed November 14, 1890. Serial No. 371,407. (No specimens.)

*To all whom it may concern:*

Be it known that we, FRANCIS MUDIE SPENCE and DAVID DICK SPENCE, manufacturing chemists, both of the Manchester Alum Works, Manchester, in the county of Lancaster, England, and ALEXANDER ESILMAN, analytical chemist, of Southport, in the county of Lancaster, England, have invented certain new and useful Improvements in the Manufacture of Alum, of which the following is a specification.

There are serious practical difficulties in the production of good crystals of soda-alum, which are well known to manufacturers of aluminous compounds.

In the specification for United States Patent, Serial No. 370,789, filed November 8, 1890, by Francis Mudie Spence and David Dick Spence, two of the applicants in the present application, there is particularly described a method of obtaining good crystals of soda alum by the mixture of suitable hot and cold solutions and the treatment of what may be termed the "cheesy magma" produced from such mixture.

In the United States patent of said Spence and Spence, No. 267,610, dated November 14, 1882, there is also described a process of obtaining crystals of soda-alum by the mixture of hot and cold solutions. According to our present invention we dispense altogether with the mixing of hot and cold solutions. We prepare from ordinary sulphate of alumina and sulphate of soda, or from alumino-ferric and sulphate of soda in about the proportions necessary to form soda-alum, a hot concentrated solution of soda-alum, from which we, in the manner hereinafter described, produce a magma, and from the magma good crystals of soda-alum.

We find that it is practically more economical to use alumino-ferric than the purer but dearer sulphates of alumina. We do not recommend the employment of what is known as "aluminous cake," as it contains a large quantity of silica, which would produce a sediment, requiring a separating operation to be performed before sufficiently pure crystals of soda-alum could be obtained.

We take a boiling solution of alumino-ferric of a strength not exceeding 1.3 specific gravity and we dissolve in this the requisite quantity of ordinary commercial salt-cake, the proportions used being about five parts, by weight, of alumino-ferric cake to about one part, by weight, of salt-cake. We perform the operation in the lead-lined steam dissolving-box used by alum-manufacturers. While steam is being blown into this box we run into the box by means of a lead pipe a stream of alumino-ferric solution, and at the same time we shovel the salt-cake into the box till the whole of it has been dissolved by the alumino-ferric solution passing into and out of the box. The solution thus obtained is allowed to flow into a lead-lined tank, which, as soon as all the charge is in, is tightly covered. In this tank we allow it to stand until practically all the suspended impurities have settled to the bottom. We find that about twenty hours is sufficient for the purpose. The clear liquid we then run off into a lead-lined evaporator fitted with coils of steam-pipe containing high-pressure steam, and by means of the coils we evaporate the solution till it attains a strength of about 1.450 specific gravity. A strength much higher than this would be found to yield on cooling a magma too stiff to be turned over without difficulty. If instead of alumino-ferric a much purer sulphate of alumina is employed, we evaporate the solution till it is about 1.425 specific gravity instead of 1.450. We then run the liquid through a fine copper sieve into a lead-lined cooler of such a depth as will allow the magma that is to be produced to be turned over without difficulty by means of a wooden shovel. We find that six inches depth of magma may be turned over without difficulty; but we prefer a less depth, because it can be cooled more quickly. We then by means of a wooden rake agitate and cool the liquid till the magma has formed, and we then by means of a wooden shovel turn the magma over at intervals until it has been brought down to ordinary atmospheric temperature and becomes transformed into or produces good crystals of soda-alum. The agitation of the liquid necessarily tends to cool it more quickly, and thus to hasten the formation of the magma; but if the liquid is allowed to cool without agitation the magma produced may then be turned over, as above described, until it is transformed into or produces good crystals. If the magma were not stirred or turned over at all, it would remain virtually unchanged for an impracticably long time, and would probably never produce good crystals.

We find that if the stirring or turning over is excessive the crystals produced are small and difficult to free from mother-liquor. We therefore give the minimum amount of stirring or turning over necessary to insure the speedy transformation of the magma, and at the same time to produce large and well-draining crystals. We find that stirring or turning over at intervals of about two hours is quite suitable for the purpose. We find that in from two to three days, according to the temperature of the surrounding air, a six-inch depth of liquor is in this way changed into magma, and the magma into crystals and mother-liquor, and that a less depth of liquor is changed into magma and the magma into crystals and mother-liquor in much less time. After the magma has been transformed we separate the impure mother-liquor from the crystals by a centrifugal machine, or by other suitable means.

The quantity of soda-alum we obtain by the above-described process is equal to or greater than the weight of the alumino-ferric cake employed to produce it, and is of course very much freer from iron.

We utilize the mother-liquor from the crystals either (a) by concentrating it to about the density previously named—that is to say, to about 1.45 specific gravity—and obtaining from it by the process already described another but more impure crop of crystals of soda-alum, or (b) by converting its soda-alum into potash-alum, or ammonia-alum, the alumina being readily crystallized out of the solution, as potash-alum or ammonia-alum on the addition to the heated solution of the proper potash or ammonia salt, or (c) by employing it for the purification of sewage or other impure waters.

It is obvious that the treatment of the hot strong solution which is described in our present specification involves smaller vessels and a less amount of manipulation for the production of a given weight of soda-alum than is required by the treatment of the hot and cold solutions described in said application, Serial No. 370,789. On the other hand, the magma produced from the mixed liquids is softer, and thus easier to manipulate than that produced from the hot solution alone.

Should it be desired to produce a still purer soda-alum than that yielded by the crystals above referred to, we may subject the said crystals to a process of purification analogous to that in general use for the purification of ordinary crystallizable salts—viz., that of dissolving the crystals and recrystallizing; but in the case of soda-alum it is obvious that the solution of first crystals must be brought through the above-described magma stage before the purer second crystals can be obtained. As in the case of the recrystallization of other salts, the mother-liquor of the second crystallization may, however, be used to wash the first crystals after they have been well drained or otherwise freed as far as practicable from their mother-liquor. In this way purer second crystals can be obtained than can be produced by dissolving and recrystallizing unwashed first crystals. The liquor which has washed the first crystals may be added to the new charges of alumino-ferric and salt-cake solution or sulphate of alumina and salt-cake solution, as the case may be, which has been prepared for the production of new quantities of first crystals, and the whole may then be evaporated to the proper density for producing first crystals.

It has already been pointed out when referring to the production of soda-alum from salt-cake and a purer sulphate of alumina than alumino-ferric that the purer solution should be evaporated to about 1.425 specific gravity instead of about 1.45, as in the case of the solution of salt-cake and alumino-ferric. Similarly when the first crystals of soda-alum have been dissolved and a purer solution has thus been produced, the solution should be evaporated to a specific gravity of about 1.425 before producing the magma which is to yield the second crystals.

Having fully described our invention, what we claim, and desire to secure by Letters Patent, is—

The improvement in the manufacture of soda-alum, consisting in first preparing from sulphate of alumina or from alumino-ferric sulphate a boiling concentrated solution of a specific gravity not exceeding about 1.3, next dissolving in this solution sufficient sulphate of soda to form with the sulphate of alumina soda-alum, next allowing the boiling solution of the two salts to stand in a closed vessel for the settlement of the suspended impurities, next evaporating said solution to a specific gravity of about from 1.425 to 1.450, next agitating and cooling said solution until a magma is formed, and finally stirring or turning over the magma from time to time until the magma is converted into crystals of soda-alum and mother-liquor, as herein set forth.

FRANCIS MUDIE SPENCE.
DAVID DICK SPENCE.
ALEXANDER ESILMAN.

Witnesses:
ARTHUR C. HALL,
  9 *Mount St., Manchester.*
W. T. CHEETHAM,
  18 *St. Ann's Street, Manchester.*